US012352857B2

(12) United States Patent
Obayashi et al.

(10) Patent No.: US 12,352,857 B2
(45) Date of Patent: Jul. 8, 2025

(54) PARKING ASSIST APPARATUS

(71) Applicant: TOYOTA JIDOSHA KABUSHIKI KAISHA, Toyota (JP)

(72) Inventors: Motonari Obayashi, Nagakute (JP); Takuya Nakagawa, Nagoya (JP); Yoshiki Hayakawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 186 days.

(21) Appl. No.: 18/467,486

(22) Filed: Sep. 14, 2023

(65) Prior Publication Data

US 2024/0134043 A1 Apr. 25, 2024
US 2024/0230894 A9 Jul. 11, 2024

(30) Foreign Application Priority Data

Oct. 19, 2022 (JP) ................................. 2022-167558

(51) Int. Cl.
*B60W 30/06* (2006.01)
*G01S 15/931* (2020.01)
*G06V 20/58* (2022.01)

(52) U.S. Cl.
CPC ........... *G01S 15/931* (2013.01); *B60W 30/06* (2013.01); *B60W 2420/403* (2013.01); *B60W 2420/54* (2013.01); *G06V 20/586* (2022.01)

(58) Field of Classification Search
CPC .... G01S 15/931; G06V 20/586; B60W 30/06; B60W 2420/403; B60W 2420/54
See application file for complete search history.

(56) References Cited

U.S. PATENT DOCUMENTS

| 9,522,661 | B2 | 12/2016 | Inoue et al. | |
| 9,604,638 | B2 | 3/2017 | Kiyokawa et al. | |
| 9,738,276 | B2 | 8/2017 | Kiyokawa et al. | |
| 9,828,028 | B2 | 11/2017 | Ishijima et al. | |
| 9,836,658 | B2 | 12/2017 | Kiyokawa et al. | |
| 9,875,655 | B2 | 1/2018 | Kiyokawa et al. | |
| 10,031,227 | B2 | 7/2018 | Kiyokawa et al. | |
| 10,150,486 | B2 | 12/2018 | Hoshino et al. | |
| 10,239,520 | B2 | 3/2019 | Tomozawa et al. | |
| 10,242,575 | B1 * | 3/2019 | Chan | G08G 1/142 |
| 10,262,537 | B1 * | 4/2019 | Kim | H04W 4/44 |

(Continued)

FOREIGN PATENT DOCUMENTS

JP 2014-234057 A 12/2014

*Primary Examiner* — Calvin Cheung
(74) *Attorney, Agent, or Firm* — Sughrue Mion, PLLC

(57) ABSTRACT

The parking assist apparatus includes a sensor that detects an object by receiving a reflected wave reflected by the object by a transmitted wave, and a controller that executes parking assist control for parking the vehicle in a parking space set based on a detection result of the sensor. The controller provides a predetermined margin to a size of a peripheral object, which is an object detected by the sensor and exists around the parking space, in a provisional direction in which the parking space is narrowed. The controller executes parking assist control using a size of the peripheral object to which the margin is provided. When the size of the peripheral object newly detected by the sensor becomes larger than the size to which the margin is provided, the controller executes parking assist control using the size of the peripheral object newly detected by the sensor.

4 Claims, 6 Drawing Sheets

(56) References Cited

U.S. PATENT DOCUMENTS

| | | | |
|---|---|---|---|
| 10,377,416 | B2 | 8/2019 | Fukukawa et al. |
| 12,269,462 | B1* | 4/2025 | Garimella .......... B62D 15/0285 |
| 2009/0260907 | A1* | 10/2009 | Moshchuk ......... B62D 15/0285 |
| | | | 701/28 |
| 2010/0271236 | A1* | 10/2010 | Moshchuk ......... B62D 15/0285 |
| | | | 340/932.2 |
| 2016/0075326 | A1* | 3/2016 | Kiyokawa .............. B60K 35/28 |
| | | | 701/41 |
| 2016/0075329 | A1* | 3/2016 | Tomozawa ............ B60W 10/20 |
| | | | 701/41 |
| 2020/0207416 | A1* | 7/2020 | Tsunekazu ............. B60Q 9/005 |
| 2021/0041870 | A1* | 2/2021 | Dyer ............... B60W 60/00253 |
| 2021/0107468 | A1* | 4/2021 | Wang .................. B60W 60/001 |

\* cited by examiner

PARKING ASSIST APPARATUS

TECHNICAL FIELD

The present invention relates to a parking assist apparatus that executes parking assist control for automatically performing a part or all of operations necessary for parking a vehicle in a parking space set based on a detection result of a sensor for detecting an object by receiving a reflected wave of a transmitted wave.

BACKGROUND

Conventionally, there has been known a parking assist apparatus. The parking assist apparatus sets a parking space based on a detection result of an ultrasonic sensor or the like, and executes parking assist control for parking the vehicle in the parking space. For example, a parking assist apparatus described in Patent Literature (hereinafter, referred to as a "conventional apparatus") determines whether or not the following condition is satisfied when a true space length of the parking space is detected after a space length is detected to be shorter than the true space length (that is, when a true size is detected after a size of the parking space is detected to be narrower than the true space size).
Condition: A deflection angle of the vehicle with respect to a longitudinal direction of the parking space is less than or equal to a threshold value.

When the above condition is satisfied, the conventional apparatus executes the parking assist control using the newly detected size of the parking space.

SUMMARY

Even if the size of the parking space is detected to be wider than the "already detected size", there is no problem that the vehicle cannot be accurately parked at the target parking position in the parking space. However, when the size of the parking space is detected to be narrower than the "already detected size", the above problem is more likely to occur.

The present invention has been made to address the above-described problems. That is, an object of the present invention is to provide a parking assist apparatus that increases a possibility that the vehicle can be accurately parked at the target parking position even when the size of the parking space is detected to be narrower than the "already detected size".

The parking assist apparatus (hereinafter, referred to as "the present invention apparatus") includes a sensor (24A-24D, 26A-26D, 28A and 28B, 30A and 30B) for detecting an object by receiving a reflected wave from which a transmitted wave is reflected by the object, and a controller (20) for executing a parking assist control for automatically performing a part or all of operations necessary for parking a vehicle in a parking space set based on a detection result of the sensor. The controller is configured to provide a predetermined margin to a size of a peripheral object in a provisional direction in which the parking space is narrowed by providing the margin (step 530). The peripheral object is an object detected by the sensor and is an object existing in the periphery of the parking space. The controller executes the parking assist control with using the size of the peripheral object to which the margin is provided (step 535, step 630). Then the controller is configured to stop to provide the margin and execute the parking assist control with using the size of the peripheral object newly detected by the sensor without providing the margin (step 640, step 630), when the size of the peripheral object newly detected by the sensor becomes larger, in the provisional direction, than the size of the peripheral object to which the margin is provided (step 635 "Yes").

The present invention apparatus provides the margin to the size of a peripheral object in the provisional direction in which the parking space is (becomes) narrowed by providing the margin. Accordingly, even if the size of the parking space becomes narrower than the "already detected size", the amount of change between the size of the parking space and already detected size can be reduced, and the possibility that the vehicle can be accurately parked at the target parking position can be increased.

Further, in the present invention apparatus, when the "size of the peripheral object newly detected by the sensor" becomes larger than the "size of the peripheral object to which the margin is provided", the provision of the margin is stopped, and the parking assist control is executed using the size of the peripheral object newly detected by the sensor without providing the margin. Accordingly, it is possible to reduce the possibility that the vehicle is stopped due to the increase in the possibility that the vehicle comes into contact with the peripheral object during the execution of the parking assistance control.

DETAILED DESCRIPTION

Figure 1:
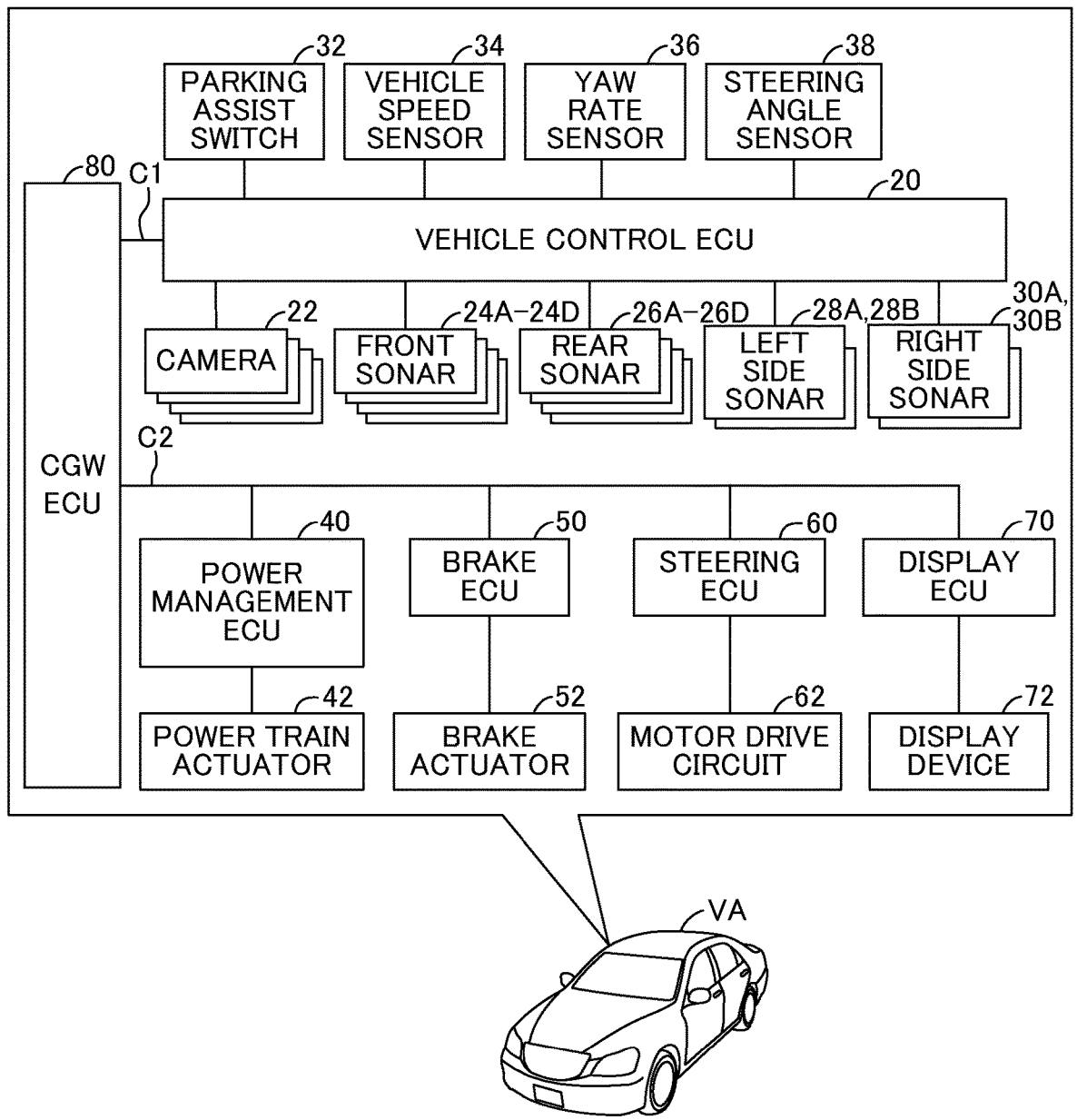
FIG. 1 is a schematic configuration diagram of a system comprising a parking assist apparatus according to an embodiment of the present invention.

As illustrated in FIG. 1, a parking assist apparatus 10 (hereinafter, referred to as "the apparatus 10") according to the present embodiment is applied to a vehicle VA and includes components illustrated in FIG. 1.

A vehicle control ECU20 is an ECU that executes parking assist control, which is a kind of automated driving, and is hereinafter referred to as "ECU20". The parking assist control is a control for automatically performing a part or all of operations necessary (required) for parking the vehicle VA in a parking space PS.

In the present specification, "ECU" is an electronic control unit including a microcomputer as a main part. The ECU is also referred to as a controller and a computer. The microcomputer includes a CPU (processor), a ROM, a RAM, an interface, and the like. Some or all of the ECU20 and the plurality of the ECU described below may be integrated into one ECU.

The plurality of cameras 22 includes a front camera, a left camera, a right camera and a rear camera. The front camera, the left camera, the right camera and the rear camera respectively capture the front, left, right and rear of the vehicle VA to acquire the front image, left image, right image and rear image.

Each sonar included in the apparatus 10 will be described below. The sonar transmits an ultrasonic wave. The sonar acquires a distance between the sonar and a "reflection point that is a point on an object that reflects the transmitted ultrasonic wave" based on a time period from transmission of the ultrasonic wave to reception of the ultrasonic wave. The sonar transmits object information to the ECU20 including the above described distance and the "reflected intensity of the received ultrasonic wave".

Figure 2:
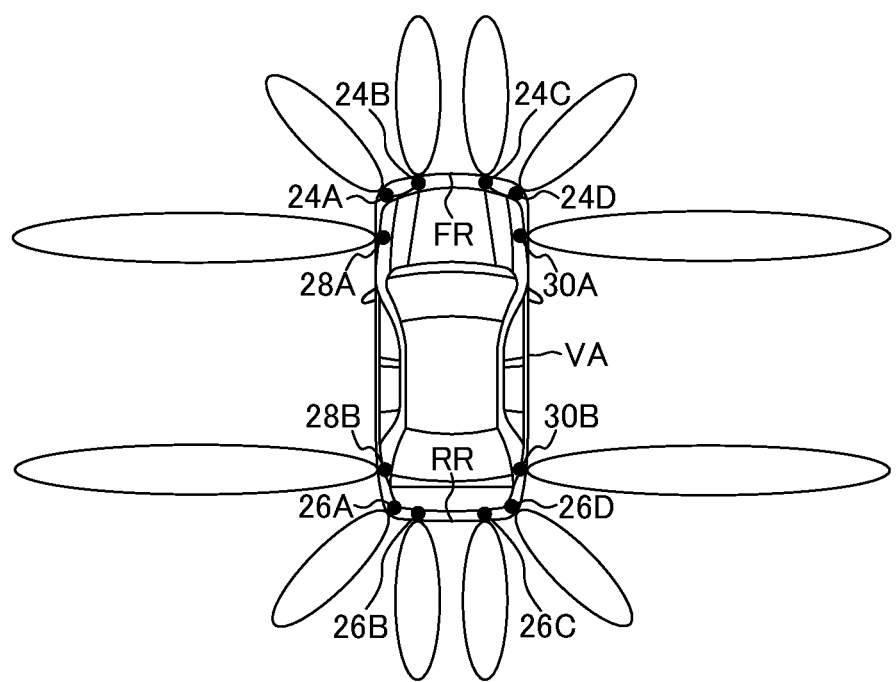
FIG. 2 is an explanatory view of detection ranges of sonars of the parking assist apparatus.

As shown in FIG. 2, the front sonars 24A to 24D are disposed on the front end face FR of the vehicle VA. The rear sonars 26A to 26D are disposed on the rear end face RR of the vehicle VA. The left side sonars 28A and 28B are disposed on the left side of the vehicle VA. The right side sonars 30A and 30B are disposed on the right side of the vehicle VA.

As shown in FIG. 2, the front sonars 24A to 24D acquire the distance to the object located in front of the vehicle VA. The rear sonars 26A to 26D acquire the distance to the object located behind the vehicle VA. The left side sonars 28A and 28B acquire the distance to object located on the left side of the vehicle VA. The right side sonars 30A and 30B acquire the distance to object located on the right side of the vehicle VA. Note that the side sonars 28A, 28B, 30A and 30B can detect the object farther than the object detected by the front sonars 24A to 24D and the rear sonars 26A to 26D.

A parking assist switch 32 is a switch for the driver to perform an operation related to the parking assist control. A vehicle speed sensor 34 detects a speed of the vehicle VA (vehicle speed Vs). A yaw rate sensor 36 detects a yaw rate of the vehicle VA. A steering angle sensor 38 detects a steering angle θ of the vehicle VA. The vehicle control ECU20 receives the detected values detected from the parking assist switch 32 and these sensors.

A power management ECU40 is connected to a power train actuator 42. The power management ECU40 controls the power train actuator 42. The powertrain actuator 42 changes a driving force generated by a driving device (for example, an internal combustion engine and/or an electric motor) of the vehicle VA. A brake ECU50 is connected to the brake actuator 52 and controls a brake actuator 52. The brake actuator 52 controls a braking force applied to the vehicle VA. A steering ECU60 drives a steering assist motor (not shown) by controlling a motor drive circuit 62. Thus, the steering ECU60 changes the steering angle of the vehicle VA. A display ECU70 controls a display device 72, which is a display device and a touch panel, to display a landscape image of a traveling direction of the vehicle VA, a bird's-eye view image of the vehicle VA and a periphery area of the vehicle VA, and the like.

A CGW (Control Gateway) ECU80 controls transmission and reception of information between the plurality of ECUs via the first communication line C1 and the second communication line C2.

(Operation)

Operation of the ECU20 of the apparatus 10 will be described.

The ECU20 searches a parking space PS in which the vehicle VA can park while recognizing an object around the vehicle VA based on the images captured by the cameras 22 and the object information acquired by the sonar. The ECU20 provides a predetermined margin d to an object existing in the periphery of the parking space PS (hereinafter referred to as "peripheral object PO"). The predetermined margin d is provided to the peripheral object PO in a provisional direction so that the parking space PS is (becomes) narrowed. Thereafter, the ECU20 executes the parking assist control with using the "size of the peripheral object PO to which the margin d is provided (hereinafter, referred to as "margin size")". That is, the ECU20 generates the parking route PR by using the margin size, and controls the vehicle VA so that the vehicle VA travels along the parking route PR. The parking route PR is a route on which the vehicle VA travels to park in the parking space PS.

Thereafter, the ECU20 executes the parking assist control while recognizing an object around the vehicle VA until the vehicle VA completes parking in the parking space PS. When the size of the peripheral object PO recognized this time (hereinafter, referred to as the "current size") becomes larger in the provisional direction than the margin size, the ECU20 executes the parking assist control with using the current size.

The sonar has a problem that the sonar cannot accurately acquire the distance of the reflection point on a non-vertical surface of the object. The non-vertical surface is a surface that is not perpendicular to the sonar. The sonar cannot receive the reflected wave from the reflection point on the non-vertical surface, or even if the reflected wave can be received, the reception intensity of the reflected wave is low, so that the above problem occurs.

Due to the above-described problem, the ECU20 may not be able to detect an opposing surface of the peripheral object PO facing the parking space PS. As a result, the ECU 20 may erroneously detect the size of the parking space PS widely. Thereafter, if the ECU20 detects the size of the parking space PS to be narrower than the size detected previously, there is possibility that the vehicle VA cannot accurately park at the target position Ptgt in the parking space PS.

According to the present embodiment, the ECU20 provides the margin d to the size of the peripheral object such that the parking space PS is narrowed. Accordingly, even if the true size of the parking space PS is narrower than the detected size, the amount of change in size of the parking space PS can be suppressed to be shorter. Further, the ECU20 executes the parking assist control with using the current size when the current size becomes larger than the margin size. As a result, it is possible to prevent the vehicle VA from approaching the peripheral object to such a level that the vehicle needs to be stopped due to a high possibility that the vehicle VA contacts the peripheral object. As described above, the ECU20 can increase the possibility that the vehicle VA can be accurately parked in the parking space PS.

Example of Operation

Figure 3:
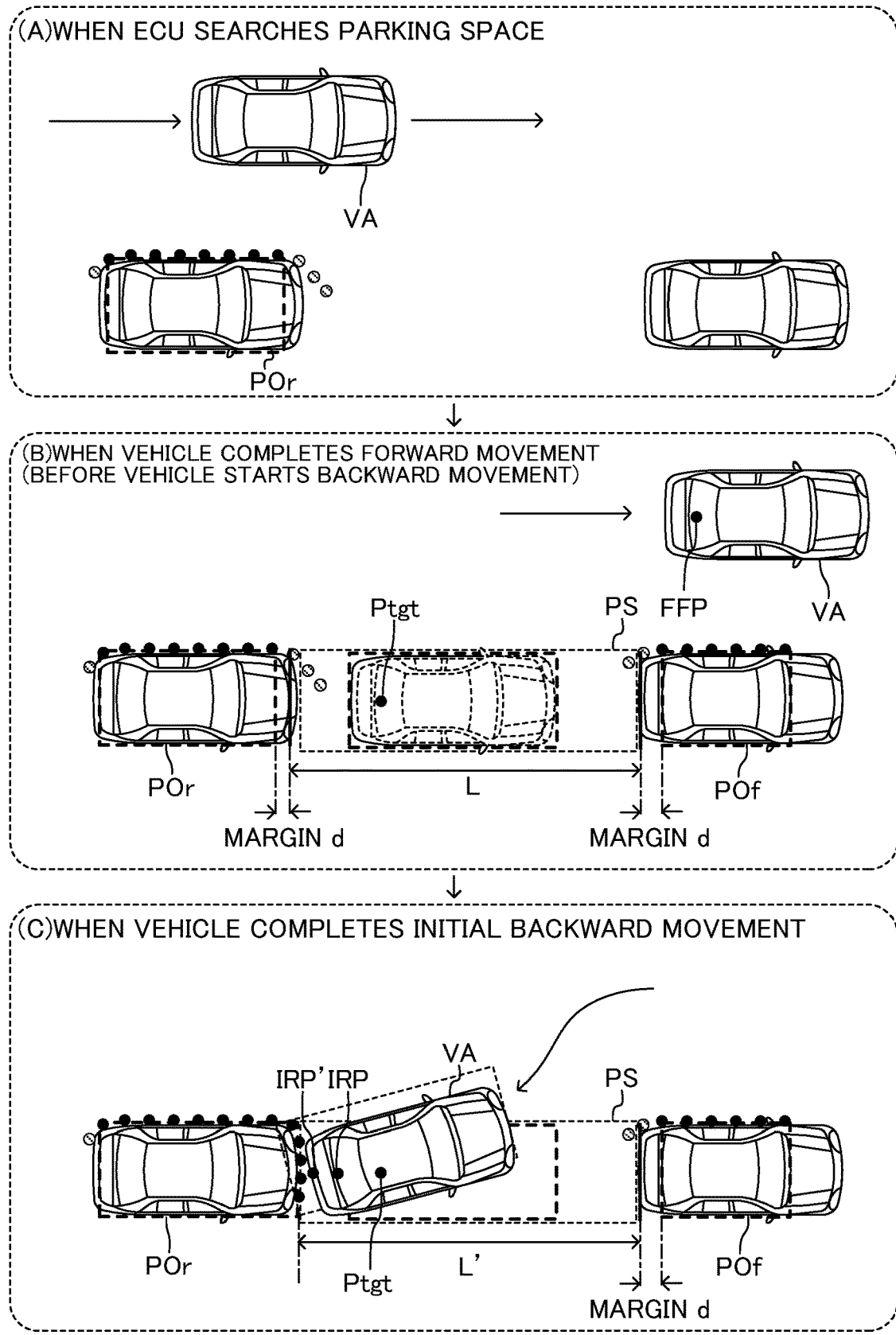
FIG. 3 is an explanatory view of an outline of the parking assist control to be executed by the parking assist apparatus.

Referring to FIG. 3, an exemplary operation of the ECU20 for executing the parking assist control to park the vehicle VA in parallel (tandem) will be described.

First, the ECU20 searches the parking space PS while recognizing an object. In the embodiment illustrated in (A) of FIG. 3, the ECU20 recognizes an object POr (hereinafter, also referred to as a "rear peripheral object POr") that is a vehicle located on the right side of the vehicle VA based on the right side sonars 30A and 30B. The rear peripheral object POr is an object located behind the vehicle VA when the vehicle VA completes the parallel (tandem) parking.

However, the ECU20 recognizes the object POr having a size indicated by a dotted line in (A) of FIG. 3 (that is, a size smaller than an true (actual) size) based on a reflection point (a black circle shown in (A) of FIG. 3) on the left side surface of the object POr. In this case, the ECU20 cannot detect the front end portion and the rear end portion of the left side surface of the object POr, the front end surface of the object POr, and the rear end surface of the object POr. Generally, since the front end portion and the rear end portion of the left and right side surfaces of the vehicle are designed to be rounded, the reception intensity from the reflection points (thin black circles in FIG. 3) on the front end portion and the rear end portion of the left side surface of the object POr is low. Therefore, the ECU20 determines that the accuracy of distance to these reflection points is low, and does not use the distance to these reflection points for recognizing the object POr. Further, the front and rear end surfaces of the object POr are non-vertical surfaces that are not perpendicular to the left side sonars 28A and 28. Therefore, the ECU20 does not receive reflected waves from these surfaces.

Thereafter, as the vehicle VA continues to move forward, the ECU20 detects the parking space PS in front of the object POr. After detecting the parking space PS, the ECU20 sets the target position Ptgt in the parking space PS. The ECU20 specifies a forward movement completion position FFP at which the vehicle VA completes a forward movement and starts a backward movement.

As illustrated in (B) of FIG. 3, when the vehicle VA reaches the forward movement completion position FFP, the ECU20 recognizes an object POf that is a vehicle located on the right side of the vehicle VA. The object POf may also be referred to as a front peripheral object POf. The front peripheral object POf is an object located in front of the vehicle VA when the vehicle VA completes the parallel parking. It should be noted that the ECU20 recognizes the object POf in a "size smaller than the true (actual) size of the object POf" as in the case of the object POr.

The ECU20 provides margins d to the rear peripheral object POr and the front peripheral object POf before the vehicle VA starts to move backward. These margins d are provided to the opposite surface of the respective object POr and POf. The opposite surfaces are the surfaces which are faced with the parking space PS, respectively. Therefore, the parking space PS is narrowed by providing the margins. More specifically, the ECU20 provides the margin d such that the space length L of the parking space PS is shortened with respect to the front end surface of the rear peripheral object POr and the rear end surface of the front peripheral object POf. The space length L is a length of the parking space PS in the "front-rear axial direction of the vehicle VA stopped at the target parking position Ptgt". The margins d to be provided to the rear peripheral object POr and the front peripheral object POf may differ from each other.

The ECU20 generates the parking route PR with using the size of the rear peripheral object POr and the front peripheral object POf to which the margins d are provided.

The ECU20 then controls the vehicle VA to move backward along the parking route RP. During the vehicle VA moves backward, the ECU20 continues to recognize the object. Then, the rear sonars 26A to 26D start to detect the front end surface of the rear peripheral object POr. Here, when at least one of the following conditions 1 and 2 is satisfied due to the traveling of the vehicle VA, the ECU20 stops to provide the margin d and executes the parking assist control with using the recognized size of the peripheral object PO.

Condition 1: The current size is larger in the provided direction in which the parking space PS is narrower (the direction in which the space length L is shorter) than the margin size.

Condition 2: The opposite surface of the peripheral object PO facing with the parking space PS is detected.

By the time the vehicle VA reaches an initial-backward position IRP shown in © of FIG. 3, any one of the condition 1 and the condition 2 is satisfied, and the ECU20 stops to provide the margin d to the rear peripheral object POr. When the condition 1 is satisfied, the ECU20 recognizes the size of the rear peripheral object POr by the current size. When the condition 2 is satisfied, the ECU 20 recognizes the size of the rear peripheral object POr by the size determined based on the opposite surface. When the vehicle VA reaches the initial-backward position IRP, the ECU20 controls the vehicle VA so that the vehicle VA begins to move forward to a turned-off position. The space length L' when the vehicle VA reaches the initial-backward position IRP is slightly longer than the space length L illustrated in (B) of FIG. 3. Thereafter, when the vehicle VA reaches a turned-off position, the ECU20 controls the vehicle VA so that the vehicle VA moves backward and parks to the target parking position. Note that, when any one of the condition 1 and the condition 2 is satisfied with respect to the front peripheral object POf while the vehicle VA moves forward to the turned-off position, the ECU 20 stops to provide the margin d to the front peripheral object POf.

Here, in the case where the ECU20 generates the parking route PR without providing the margin d to the size of the rear peripheral object POr recognized before the vehicle VA moves to backward, the ECU 20 sets the initial backward position to the position located on the rear side of the initial backward position IRP. In this case, when the vehicle VA moves backward and approaches the rear peripheral object POr, the ECU20 determines that the vehicle VA is highly likely to contact the rear peripheral object POr if the vehicle VA reaches the initial backward position IRP', and the ECU 20 controls the vehicle VA so that the vehicle VA starts to move forward to the turned-off position before the vehicle VA reaches the initial backward position IRP'. Therefore, the vehicle VA cannot be sufficiently moved backward, and there is a high possibility that parking of the vehicle VA is completed at a position shifted to the left from the target parking position Ptgt. In the present embodiment, since the parking route PR is generated after the margin d is provided to the size of the rear peripheral object POr, the above-described possibility can be reduced.

(Specific Operation)

Figure 4:
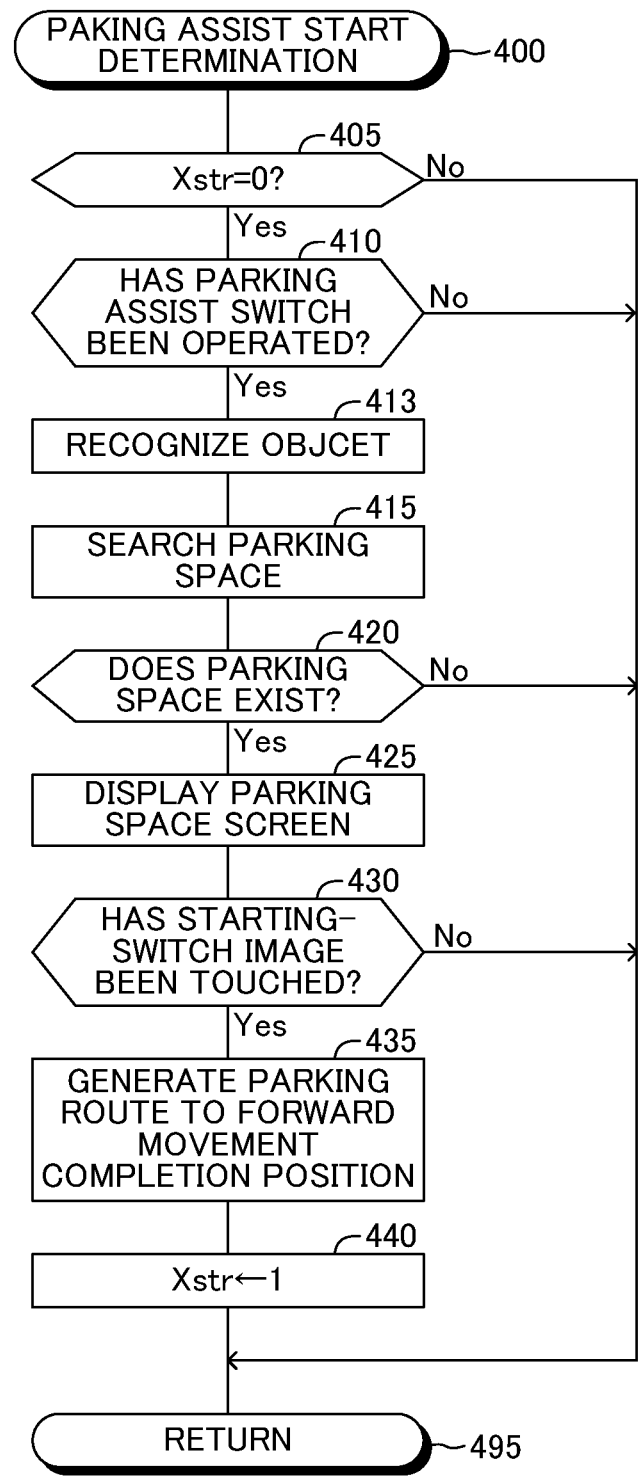
FIG. 4 is a flow chart of a program to be executed by a CPU of the parking assist apparatus.
Figure 5:
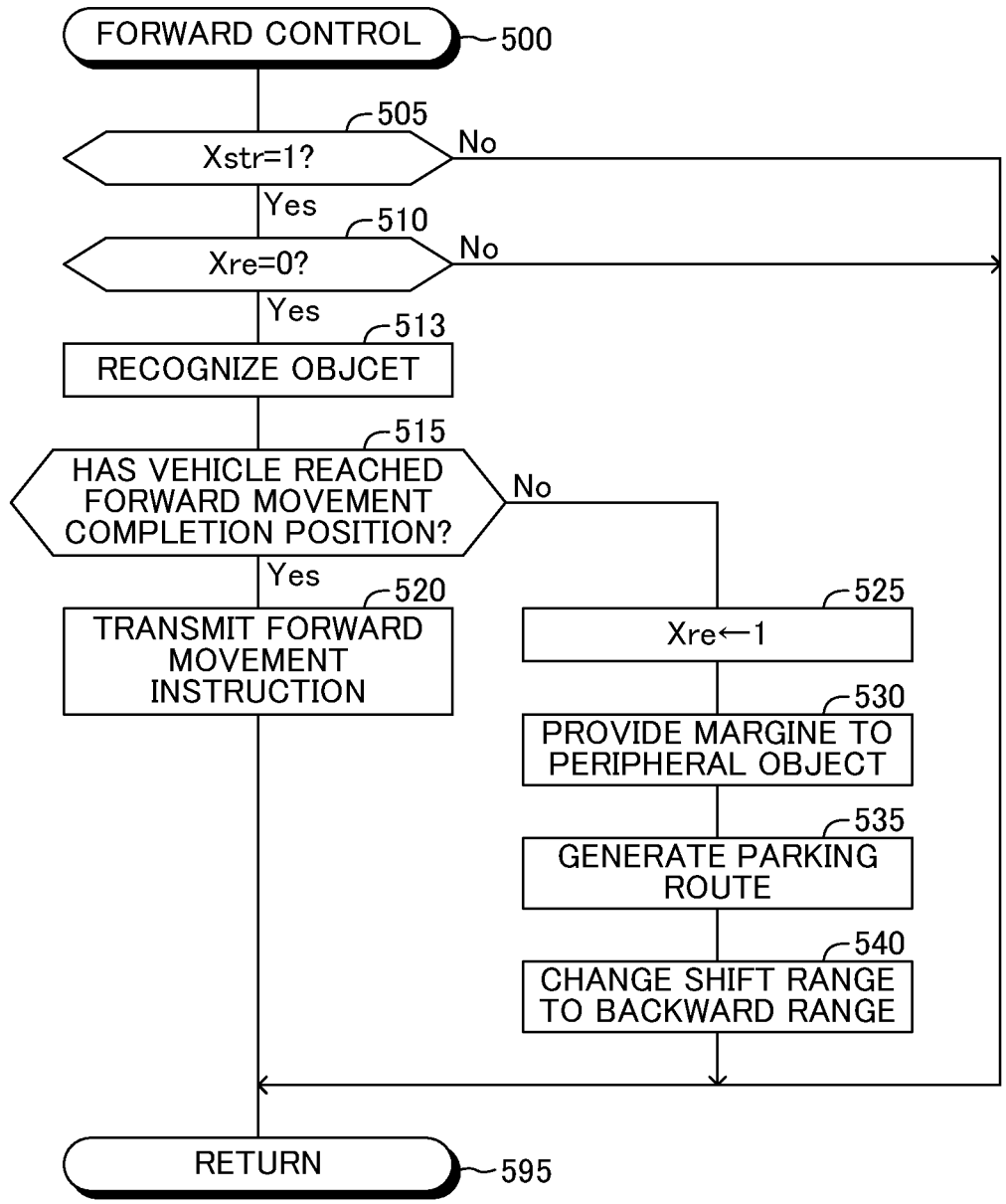
FIG. 5 is a flow chart of a program to be executed by a CPU of the parking assist apparatus.
Figure 6:
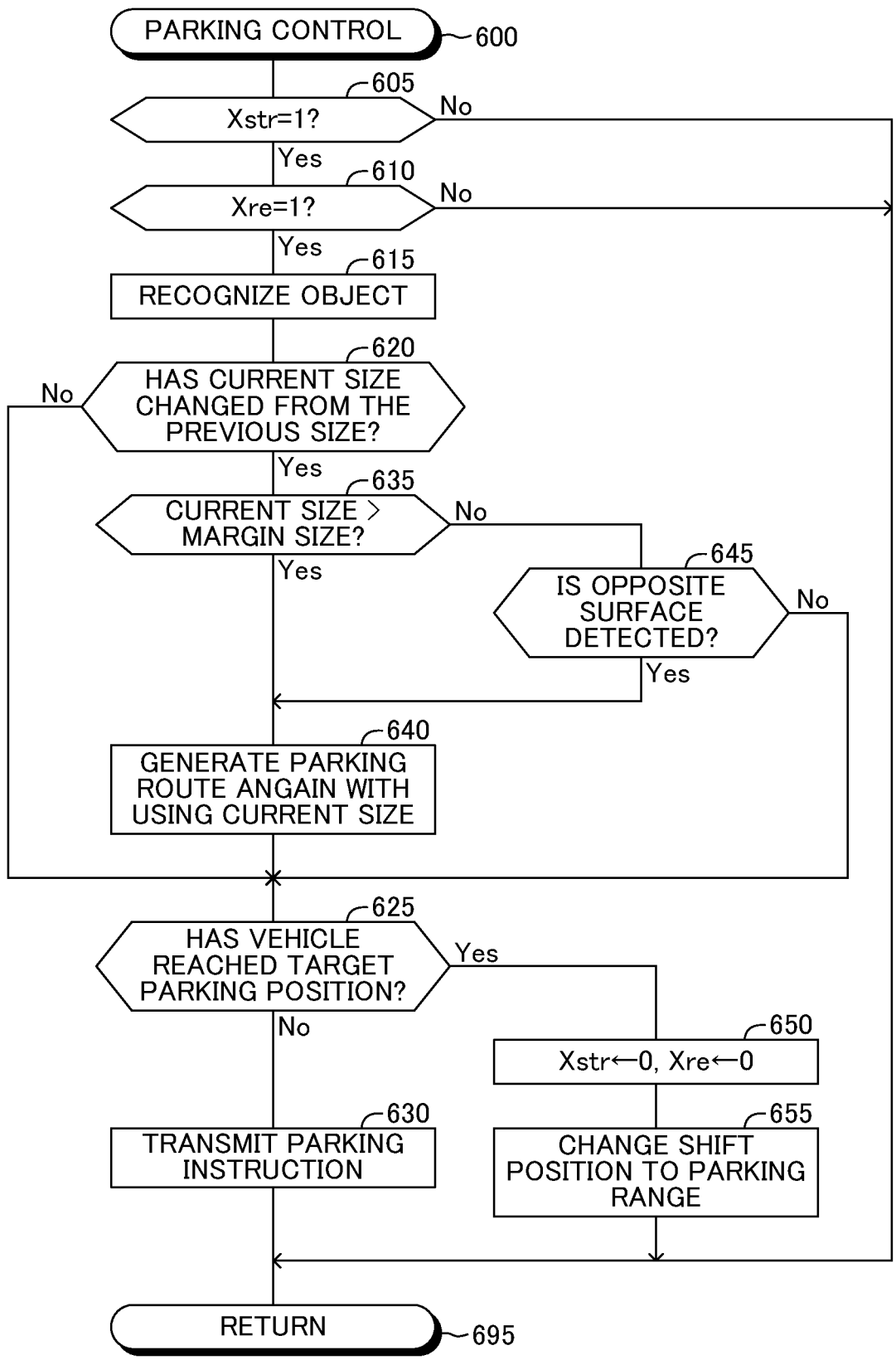
FIG. 6 is a flow chart of a program to be executed by a CPU of the parking assist apparatus.

The CPU of the ECU20 executes the routines illustrated by the flow charts in FIGS. 4 to 6 every time a predetermined period of time elapses.

<Parking Assist Start Determination Routine>

When an appropriate time point has arrived, the CPU starts the process from step 400 of FIG. 4, and in step 405, the CPU determines whether or not a starting flag Xstr is "0".

The starting flag Xstr is set to "1" when the parking assist control is started, and is set to "0" when the parking assist control is ended. The starting flag Xstr is also set to "0" in the initial routine. The initial routine is a routine executed by the CPU when an ignition-key switch (not shown) of the vehicle VA is changed from an off-position to an on-position.

In the case where the starting flag Xstr is "0" (step 405 "Yes"), the CPU determines in step 410 whether or not the parking assist switch 32 has been operated. In the case where the parking assist switch 32 is not operated (step 410 "No"), the CPU proceeds the process to step 495 and exits the routine. In the case where the parking assist switch 32 is operated (step 410 "Yes"), the CPU executes steps 413 to 420.

Step 413: the CPU recognizes the object based on the images acquired from the cameras 22 and the detection results acquired from the sonars.

Step 415: the CPU searches the parking space PS based on the images acquired from the cameras 22 and the recognition-results of the objects.

Step 420: the CPU determines whether or not a parking space PS exists.

In the case where the parking space PS does not exist (step 420 "No"), the CPU proceeds the process to step 495 and exits the routine. In the case where the parking space PS exists (step 420 "Yes"), the CPU executes steps 425 and 430.

Step 425: the CPU transmits an instruction for displaying a parking space screen to the display ECU70. The parking space screen is a screen including an image around the parking space PS and a starting-switch image (not shown). Upon receiving the instruction, the display ECU70 causes the display device 72 to display the parking space screen.

Step 430: the CPU determines whether or not the starting-switch image has been touched.

In the case where the starting-switch image is not touched (step 430 "No"), the CPU proceeds the process to step 495 and exits the routine. In the case where the starting-switch image is touched (step 430 "Yes"), the CPU executes steps 435 and 440.

Step 435: the CPU determines the forward movement completion position FFP and generates a parking route PR to the forward movement completion position FFP.

Step 440: the CPU sets the starting flag Xstr to "1".

After that, the CPU proceeds the process to step 495 and exits the routine.

<Forward Control Routine>

When an appropriate time point has arrived, the CPU starts the process from step 500 of FIG. 5, and in step 505, the CPU determines whether or not the starting flag Xstr is "1".

In the case where the starting flag Xstr is "0" (step 505 "No"), the CPU proceeds the process to step 595 and exits the routine. In the case where the starting flag Xstr is "1" (step 505 "Yes"), the CPU determines whether or not a backward flag Xre is "0" in step 510.

The backward flag Xre is set to "1" when the vehicle VA reaches the forward movement completion position FFP and starts the backward movement, and is set to "0" when the vehicle VA has completed parking in the target parking position Ptgt. The backward flag Xre is set to "0" in the initial routine.

In the case where the backward flag Xre is "0" (step 510 "Yes"), the CPU executes steps 513 and 515.

Step 513: the CPU recognizes the object based on the images acquired from the cameras 22 and the detection results acquired from the sonars.

Step 515: the CPU determines whether or not the vehicle VA has reached the forward movement completion position FFP based on the vehicle speed Vs and the yaw rate Yr. The CPU may perform the above determination based on the images acquired from the cameras 22.

In the case where the vehicle VA has not reached the forward movement completion position FFP (step 515 "No"), the CPU transmits a forward movement instruction to the ECUs 40, 50 and 60, in step 520 and proceeds the process to step 595 to once exit the routine. The forward movement instruction includes a target acceleration Gtgt and a target steering angle θtgt. Until the vehicle VA reaches the predetermined position on the parking route PR, the CPU acquires the target acceleration Gtgt for the vehicle VA to travel at the predetermined speed Vpd. During a time period from a time when the vehicle VA reaches the predetermined position to a time when the vehicle VA reaches the forward movement completion position FFP, the CPU acquires a target acceleration Gtgt so that the vehicle stops when reaching the forward movement completion position FFP. The CPU acquires a target steering angle θtgt so that a midpoint (reference point) between the left and right rear wheels of the vehicle VA move on the parking route PR.

Upon receiving the forward movement instruction, the power management ECU40 and the brake ECU50 control the powertrain actuator 42 and the brake actuator 52 respectively so that the acceleration G of the vehicle VA coincides with the target acceleration Gtgt. Upon receiving the forward movement instruction, the steering ECU60 controls the motor drive circuit 62 so that the steering angle θ of the vehicle VA coincides with the target steering angle θtgt.

In the case where the vehicle VA has reached the forward movement completion position FFP (step 515 "Yes"), the CPU executes steps 525 to 540.

Step 525: the CPU sets the backward flag Xre to "1".

Step 530: the CPU provides margin(s) d to the size(s) of the peripheral object(s) PO such that the parking space PS is narrowed.

Step 535: the CPU generates a route (parking route) PR from the forward movement completion position FFP to the target parking position Ptgt with using the size of the peripheral object PO to which the margin d is provided.

Step 540: the CPU changes the shift range of the transmission (not shown) to a backward (reverse) range via a transmission actuator (not shown).

After that, the CPU proceeds the process to step 595 and exits the routine.

<Parking Control Routine>

When an appropriate time point has arrived, the CPU starts the process from step 600 of FIG. 6, and in step 605, the CPU determines whether or not the starting flag Xstr is "1".

In the case where the starting flag Xstr is "0" (step 605 "No"), the CPU proceeds the process to step 695 and exits the routine. In the case where the starting flag Xstr is "1" (step 605 "Yes"), the CPU determines whether or not the backward flag Xre is "1" in step 610.

In the case where the backward flag Xre is "0" (step 610 "No"), the CPU proceeds the process to step 695 and exits the routine. In the case where the backward flag Xre is "1" (step 610 "Yes"), the CPU executes steps 615 and 620.

Step 615: the CPU recognizes the object based on the images acquired from the cameras 22 and the detection results acquired from the sonars.

Step 620: the CPU determines whether or not the current size has changed from the previously recognized size of the peripheral object (hereinafter, referred to as "previous size").

In the case where the current size has not changed from the previous size (step 620 "No"), the CPU determines in step 625 whether or not the vehicle VA has reached the target parking position Ptgt.

In the case where the vehicle VA has not reached the target parking position Ptgt (step 625 "No"), the CPU transmits a "parking instruction including the target acceleration Gtgt and the target steering angle θtgt as well as the forward instruction" to the ECUs 40, 50 and 60 in step 630. After that, the CPU proceeds the process to step 695 and exits the routine.

In the case where the current size has changed from the previous size (step 620 "Yes"), the CPU determines in step 635 whether or not the current size is larger than the margin size.

In the case where the current size is larger than the margin size (step 635 "Yes"), the CPU generates the parking route PR again with using the current size in step 640, and the process proceeds to step 625.

In the case where the current size is equal to or smaller than the margin size (step 635 "No"), the CPU determines whether or not the opposite surface of the peripheral object PO is detected based on the detection results acquired from the sonars in step 645. As an example, the CPU determines that the reflection point is the opposite surface when the reflection point is detected at the rear side of the parking space PS. As another example, when an angle formed by the "extension line of the line segment connecting the plurality of reflection points on the rear side of the parking space PS" and the "line of the peripheral object PO that has been detected" is approximately 90 degrees, the CPU determines these reflection points as the opposite surface. In step 645, the CPU may determine the opposite surface has been detected when the object having reflection point is a vehicle based on the images captured by the cameras 22.

In the case where the opposite surface is detected (step 645 "Yes"), the CPU proceeds the process to step 640 to generate the parking route PR again with using the size of the peripheral object PO determined based on the opposite surface. On the other hand, in the case where the opposite surface is not detected (step 645 "No"), the CPU proceeds the process to step 625.

In the case where the vehicle VA reaches the target parking position Ptgt when the CPU proceeds the process to step 625 (step 625 "Yes"), the CPU executes step 650 and step 655.

Step 650: the CPU sets the starting flag Xstr and the backward flag Xre to "0". Step 655: the CPU changes the shift range of the transmission (not shown) to the parking range via the transmission actuator (not shown).

After that, the CPU proceeds the process to step 695 and exits the routine.

As described above, according to the present embodiment, the margin d is provided to the size of the peripheral object PO so that the parking space PS is narrowed. Accordingly, even when the size of the parking space PS is detected to be narrower than the "previously detected size", it is possible to increase the possibility of accurately parking the vehicle VA at the target parking position Ptgt.

(Modification)

In the above-described embodiment, the ECU20 provides the margins d to both the rear peripheral object POr and the front peripheral object POf when the vehicle VA are parked in parallel, but may provide the margin d only to either the rear peripheral object POr or the front peripheral object POf.

In the above-described embodiment, the ECU20 provides the margin d to the peripheral object PO immediately before the vehicle VA starts backward movement, but may provide the margin d to the peripheral object PO at the time when the peripheral object PO is recognized.

In the parking assist control according to the above-described embodiment, all of the operations necessary for the vehicle VA to park at the target parking position Ptgt in the parking space PS are automatically performed, but a part of the necessary operations may be automatically performed.

The present embodiment is applicable not only to parallel parking (tandem parking) but also to vertical parking (double parking, perpendicular parking). In the case where the vertical parking is performed, the ECU20 provides the margin(s) d such that the parking space PS is narrowed with respect to the opposite surface of the left peripheral object located on the left side of the vehicle VA parked in the target parking position Ptgt and/or the right peripheral object located on the right side of the vehicle VA parked in the target parking position Ptgt.

In the above-described embodiment, the sonar for detecting the object with using ultrasonic waves is exemplified as a sensor for detecting the object, but any sensor may be used as long as it detects the object with using waves (for example, electromagnetic waves, sound waves, and the like).

The apparatus 10 is applicable to vehicles such as an engine vehicle, a hybrid electric vehicle, a plug-in hybrid electric vehicle, a fuel cell electric vehicle, and an battery electric vehicle.

What is claimed is:

1. A parking assist apparatus comprising:
   a sensor for detecting an object by receiving a reflected wave from which a transmitted wave is reflected by the object; and
   a controller for executing a parking assist control for automatically performing a part or all of operations necessary for parking a vehicle in a parking space set based on a detection result of the sensor, wherein
   the controller is configured to:
   provide a predetermined margin to a size of a peripheral object in a provisional direction in which the parking space is narrowed by providing the margin, the peripheral object existing in the periphery of the parking space and being an object detected by the sensor;
   execute the parking assist control with using the size of the peripheral object to which the margin is provided; and
   stop to provide the margin and execute the parking assistance control with using the size of the peripheral object detected by the sensor without providing the margin, when the size of the peripheral object detected by the sensor becomes larger, in the provisional direction, than the size of the peripheral object to which the margin is provided.

2. The parking assist apparatus according to claim 1, wherein
   the controller is configured to stop to provide the margin and execute the parking assist control by using a size of the peripheral object determined based on an opposite surface of the peripheral object facing with the parking space, when the sensor detects the opposite surface of the peripheral object.

3. The parking assist apparatus according to claim 1, wherein
   the parking assist control is a control for automatically performing a part or all of the operations necessary for parking the vehicle in the parking space in parallel, and
   the controller is configured to provide the margin for at least one of a rear peripheral object and a front peripheral object, the rear peripheral object being an object located behind the vehicle in which parallel parking to the parking space has been completed, and the front peripheral object being an object located in front of the vehicle in which parallel parking to the parking space has been completed.

4. The parking assist apparatus according to claim 3, wherein the controller is configured to provide the margin to at least one of the rear peripheral object and the front peripheral object before the vehicle starts to move backward to the parking space.

\* \* \* \* \*